Patented Apr. 10, 1951

2,548,718

UNITED STATES PATENT OFFICE 2,548,718

STRIPPING AGENT FOR POLYSULFIDE ELASTOMER COATINGS

Melvin F. George, Jr., Los Angeles, and Eugene V. Kleber, Burbank, Calif., assignors to Lockheed Aircraft Corporation, Burbank, Calif.

No Drawing. Application February 12, 1947, Serial No. 728,206

4 Claims. (Cl. 252—153)

This invention relates to stripping materials, and relates more particularly to agents for stripping or removing sealants and coatings from the surfaces of fuel and oil tanks, from external surfaces, etc.

Sealing compounds are used extensively in aircraft to seal the so-called integral fuel tanks and oil tanks and to seal other fluid handling and containing equipment. The sealing compounds are usually rubber-like polysulfide materials that are resistant to and substantially unaffected by water, oil, gasoline, and the other fluids to which they are normally subjected. It frequently becomes necessary to remove or "strip" the sealant from a tank and because of the resistance of the sealant to most solvents, etc., resort must be had to special strippers. The strippers heretofore employed in such situations have not been practical nor successful because they merely produce a limited solvation of the polysulfide sealant. This partial solvation brings about a swelling of the sealing material and nothing more, with the result that the stripping operation requires, in addition, the extensive use of brushes, scrapers, and the like, in order to effect a complete stripping away of the sealing compound from the underlying surfaces. Furthermore, it is necessary to maintain the stripping agent in substantially continuous contact with the sealant throughout the stripping operations because the sealant tends to return to its normal cured condition when the solvent effect of the stripping agent is no longer present.

It is the general object of the present invention to provide a practical and highly effective stripping material for removing applied and cured films, coatings, and bodies of polysulfide elastomer sealants, and the like.

Another object of the invention is to provide a stripper of the general class referred to that causes or effects a disintegration of the sealing and coating material as distinguished from a simple softening and swelling of the material as produced by prior strippers. As distinguished from the mere swelling of the sealant or coating that has characterized the prior strippers, the stripping agent of the present invention actually destroys or disintegrates the sealant, reducing it to a crumbly, lifeless condition so that it no longer adheres to the surface to which it was applied. The stripper completely changes the character of the coating and converts it into a non-adherent crumb-like material devoid of any appreciable strength, resiliency or surface continuity. In this state the coating material is free and washes away, leaving the surface to which it was applied clean and clear. In most cases no scraping or brushing is required, thus greatly reducing the time, labor and cost. The sealant or coating material does not return to its adherent rubber-like condition following the "stripping" action and if desired may be allowed to dry before being washed away with water.

Another object of the invention is to provide a stripper of the character referred to that is effective in stripping the various polysulfide elastomer coatings and sealing materials generally used to seal the tanks, ducts, etc., of aircraft.

Another object of the invention is to provide a stripping agent of the class mentioned that may be re-used for several stripping operations or until it becomes excessively contaminated.

A further object of the invention is to provide a stripping composition of the character described in which the solvent may be recovered by distillation after use, thus effecting a substantial economy.

The composition of the matter of the present invention comprises generally, a solvent or swelling agent for the polysulfide elastomers and depolymerizing agents for the elastomers including either the reaction product of a dialkylamine and carbon disulfide, or a mercapto compound, or both.

The active solvent of the stripper may be a cyclic ketone such as cyclopentanone or cyclohexanone or a halogenated hydrocarbon such as monochlorobenzene or perchlorethylene or mixtures thereof. Further, if desired, a selected nitrogen compound, for example morpholine, may constitute the solvent. The primary function of the active solvent is to partially swell and/or dissolve the sealant coating or film and as a secondary function the solvent serves as a carrier or vehicle for the other ingredient or ingredients of the stripping agent. In most instances the solvent will swell the applied cured sealant to increase its volume approximately 50%. It is to be understood that a mutual solvent, such as isopropanol, may be employed instead of, or in addition to, a solvent or solvent mixture chosen from the above named classes of solvents. The solvent, by swelling the applied cured coatings, films, or bodies of sealant, exposes the sealant to the disintegrating or depolymerizing action of the other ingredients of the stripping material. The proportion of solvent employed depends to a large degree upon the composition and character of the sealant to be removed and may vary from 50% to 99% by weight of the stripping material.

We have found that the reaction product of one or more dialkylamines and carbon disulfide constitutes an effective agent or ingredient for depolymerizing the polysulfide elastomer sealants and coatings and is compatible with the other ingredients of the stripper. We usually prefer to employ dibutyl ammonium dibutyl dithiocarbamate, it being understood that the reaction products of other dialkylamines and carbon disulfide are suitable and effective as depolymerizing ingredients. For example, any of the following alkylamines may be reacted with carbon disulfide to obtain a disintegrating or depolymerizing agent:

Dipropylamine
Diamylamine
Dioctylamine

The relative proportion of the dialkyl ammonium dialkyl dithiocarbamate employed in the stripping material may vary considerably. However, we have found that the reaction product is more effective when utilized in proportions up to 20% by weight than when used in larger proportions. In some cases where the other depolymerizing agent, to be described below, is employed in a suitable proportion, we may omit the reaction product of the dialkylamine and carbon disulfide. Thus the selected reaction product of one or more dialkylamines and carbon disulfide may be incorporated in the stripping agent in the proportion of from 0% to 20% by weight.

The second disintegrating or depolymerizing ingredient of the stripper is an organic mercaptan. Such a mercaptan, when incorporated in the stripper in addition to the above described depolymerizing agent, extends the utility of the stripper to the removal of a large class of polysulfide elastomers. The mercapto compounds that have been found to be effective are alkyl mercaptans such as mercapto ethanol, octyl mercaptan, lauryl mercaptan and amyl mercaptan. Where the sealant or coating to be removed is effectively stripped by an agent containing a solvent, and a reaction product of a dialkylamine and carbon disulfide, the mercapto compound may be omitted. However, it is usually desirable to incorporate a proportion of the selected mercaptan in the stripping agent to insure an effective action on the various polysulfide elastomers. Thus the proportion of the mercapto compound or compounds included in the stripper may range from 0% to 40% by weight.

The following is a typical preferred example of the composition of the stripper, the proportions being by weight:

| | Per cent |
|---|---|
| Monochlorobenzene | 90 |
| Dibutyl ammonium dibutyl dithiocarbamate | 5 |
| Mercapto ethanol | 5 |

The relative proportions of the ingredients may be varied considerably as described above and the ingredients may be selected from the above named classes to obtain stripping agents for given applications or uses. We have set forth below several additional examples of the formulations contemplated by the invention, it being understood that the examples herein described are merely typical and not restrictive of the scope of the invention.

The proportions in the following examples are by weight:

Example 1

| | Per cent |
|---|---|
| Perchlorethylene | 90 |
| Diamyl ammonium diamyl dithiocarbamate | 5 |
| Mercapto ethanol | 5 |

Example 2

| | Per cent |
|---|---|
| Isopropyl alcohol | 20 |
| Monochlorobenzene | 72 |
| Dibutyl ammonium dibutyl dithiocarbamate | 4 |
| Mercapto ethanol | 4 |

Example 3

| | Per cent |
|---|---|
| Cyclohexanone | 90 |
| Dibutyl ammonium dibutyl dithiocarbamate | 10 |

Example 4

| | Per cent |
|---|---|
| Monochlorobenzene | 90 |
| Mercapto ethanol | 10 |

Example 5

| | Per cent |
|---|---|
| Monochlorobenzene | 92 |
| Octyl mercaptan | 8 |

Example 6

| | Per cent |
|---|---|
| Monochlorobenzene | 80 |
| Dibutyl ammonium dibutyl dithiocarbamate | 20 |

In preparing or compounding the stripping agent the selected ingredients are suitably mixed together. When a reaction product of a dialkylamine and carbon disulfide is to be incorporated in the stripper, it may first be prepared and then mixed with the selected solvent and the organic mercaptan, assuming that the latter is to form a constituent of the stripper. However, if preferred, the proper proportions of the alkylamine or dialkylamines and the carbon disulfide may be mixed with the solvent and the mercaptan so that the reaction occurs in the general mixture, care being taken to allow the reaction to progress slowly.

The manner of employing the stripping agent depends to a large degree upon the nature and location of the coatings, fillets, and bodies of the sealant to be removed. In most cases the stripping agent is simply maintained in contact with the sealant for a suitable period or until the sealant coating or body has thoroughly disintegrated. The time required for this action is governed by the character and thickness of the sealing material. Following the softening and disintegration of the sealant, the stripper is drained away and the sealing material, then in a crumbly, soft condition, is readily washed or flushed away with water. The stripping agent may, if desired, be reused for several operations and the used or contaminated stripping agent may be recovered by distillation for successive reuse.

It is understood that the invention is not to be taken as limited to the express examples and procedure set forth above, these details being given only by way of illustration. We do not regard such specific details essential to the invention except insofar as they are expressed by way of limitation in the appended claims.

We claim:

1. a stripping material for polysulfide elastomer coatings and bodies comprising on an approximate weight basis 90% monochlorobenzene, 5% dibutyl ammonium dibutyl dithiocarbamate and 5% mercapto ethanol.

2. A stripping agent for polysulfide elastomer coatings comprising on an approximate weight basis 50% to 99% of a swelling agent for cured polysulfide polymers chosen from the group consisting of cyclopentanone and cyclohexanone and from 1% to 20% dibutyl ammonium dibutyl dithiocarbamate, and from 1% to 40% mercapto ethanol.

3. A liquid stripping agent for polysulfide elastomer coatings comprising on an approximate weight basis 72% monochlorobenzene, 20% isopropyl alcohol, 4% dibutyl ammonium dibutyl dithiocarbamate, and 4% mercapto ethanol.

4. A stripping agent for polysulfide elastomer coatings comprising on an approximate weight basis from 80% to 99% perchlorethylene, and from 1% to 20% by weight of diamyl ammonium diamyl dithiocarbamate.

MELVIN F. GEORGE, JR.
EUGENE V. KLEBER.

REFERENCES CITED

The following references are of record in the file of this patent:

UNITED STATES PATENTS

| Number | Name | Date |
| --- | --- | --- |
| 2,126,818 | Sager et al. | Aug. 16, 1938 |
| 2,206,643 | Patrick | July 2, 1940 |

OTHER REFERENCES

Industrial Solvents: Mellen; (1939). Page 192.